United States Patent [19]
Garito et al.

[11] Patent Number: 5,856,384
[45] Date of Patent: Jan. 5, 1999

[54] POLYCYCLIC AROMATIC COMPOUNDS HAVING NONLINEAR OPTICAL PROPERTIES

[75] Inventors: Anthony F. Garito, Radnor; Shinji Yamada, Drexel Hill; Anna Panackal, Philadelphia, all of Pa.

[73] Assignee: The Trustees of the University of Pennsylvania, Philadelphia, Pa.

[21] Appl. No.: 305,426

[22] Filed: Sep. 13, 1994

Related U.S. Application Data

[63] Continuation of Ser. No. 3,103, Jan. 11, 1993, abandoned.

[51] Int. Cl.[6] .................................................. C08G 75/72
[52] U.S. Cl. ............................................ 524/83; 525/7.1
[58] Field of Search ......................... 428/423.5; 524/83; 525/7.1

[56] References Cited

U.S. PATENT DOCUMENTS

| | | | |
|---|---|---|---|
| 4,431,263 | 2/1984 | Garito | 350/96.34 |
| 4,439,514 | 3/1984 | Garito | 430/272 |
| 4,483,583 | 11/1984 | Unger | 350/96.15 |
| 4,536,450 | 8/1985 | Garito | 428/411.1 |
| 4,579,915 | 4/1986 | Choe | 525/435 |
| 4,581,315 | 4/1986 | Garito | 430/269 |
| 4,607,095 | 8/1986 | Kuder | 525/186 |
| 4,615,962 | 10/1986 | Garito | 430/20 |
| 4,759,596 | 7/1988 | Po et al. | 350/96.15 |
| 4,950,044 | 8/1990 | Makita | 350/96.14 |
| 5,071,997 | 12/1991 | Harris | 528/353 |
| 5,371,173 | 12/1994 | Marks et al. | 528/322 |

FOREIGN PATENT DOCUMENTS

| | | |
|---|---|---|
| 61-194407 | 8/1986 | Japan . |
| 1-287505 | 11/1989 | Japan . |

OTHER PUBLICATIONS

Garito et al., "Nonlinear Optical Processes in Organic NLO Polymer Structures" Polymer Journal, v. 19(1) pp. 51–60, 1987.

Garito et al., "Microscopic Origin of 2nd Order and Properties of Organic Structures" (1987), CA#109:239379.

In Re Marzocchi, 439 F2d 220, 169 USPQ 367 (CCPA 1971).

Wu et al., "Chemical Imidization for Stability Poled ELO", Appl. Phys. Lett. (1991), 59(18), 2213–15.

Ermer et al., Thermally Stable Electrooptic Polymers, (1991), 92–93, Polymer Preprints 32(3), 92–3.

A. F. Garito, et al. "Origin of Nonlinear Optical Properties of Rigid Rod Polymers" MRS Int'l. Mtg. on Adv. Mats. vol. 12 1989 Materials Research Society pp. 3–20.

A. F. Garito, et al. "Microscopic Origin of Second Order Nonlinear Optical Properties of Organic Structures" Edited by Paras N. Prasad and Donald R. Ulrich (Plenum Publishing Corp, 1988).

J. W. Wu, E. S. Binkley, J. T. Kenney, R. Lytel and A. F. Garito "Highly Thermally Stable Electro-optic Response in Poled Guest–host Polymide Systems Cured at 360° C." J. Appl. Phys. 69(10) 15 May 1991 pp. 7366–7368.

J. R. Heflin and A. F. Garito "Optics Beyond the Limits" Nature vol. 356 19 Mar. 1992.

A. F. Garito and Kenneth D. Singer "Organic Crystals and Polymers—A New Class of Nonlinear Optical Materials" Reprinted from Laser Focus Magazine, Feb. 1982, pp. 59–64.

C. C. Teng and A. F. Garito "Dispersion of the Nonlinear Second-Order Optical Susceptibility of an Organic System: p–Nitroaniline" 1983 The American Physical Society vol. 50, No. 5, 31 Jan. 1983, pp. 350–352.

C. E. Sroog "Polymides" Prog. Polym. Sci. vol. 16, 561–694, 1991.

Ermer, S. et al., "Thermally Stable Electro–Optic Polymers", Polymer Preprints 1991, 32(3), 92–93.

Wu et al., "Highly Thermally Stable Electrooptic Response in Poled Guest–Host Polymide Systems Cured at 360 Degrees Centigrade", Journal of Applied Physics 1991, 69(10), 7366–7368.

Primary Examiner—Cecilia J. Tsang
Assistant Examiner—Patrick R. Delaney
Attorney, Agent, or Firm—Woodcock Washburn Kurtz Mackiewicz & Norris LLP

[57] ABSTRACT

Devices and materials containing certain stable, polycyclic aromatic compounds exhibit sensible, second order nonlinear optical effects. In general, useful polycyclic aromatic compounds possess electron-donating and electron-withdrawing chemical functionality but no center of inversion symmetry on either the molecular or crystalline unit cell level.

59 Claims, 1 Drawing Sheet

POLYCYCLIC AROMATIC COMPOUNDS HAVING NONLINEAR OPTICAL PROPERTIES

This is a continuation of application Ser. No. 08/003,103, filed Jan. 11, 1993 now abandoned.

GOVERNMENT SUPPORT

This work has been supported by the Defense Advanced Research Projects Agency (DARPA) and the Air Force Office of Scientific Research (AFOSR) under contract number F49620-85-C0105.

FIELD OF THE INVENTION

This invention relates to materials that are useful in the fabrication of electro-optical, second harmonic generating, electro-acoustic, waveguide, fiber, semiconductor, and other useful photonic devices. In particular, this invention is concerned with compounds that exhibit second order nonlinear optical properties and possess suitable thermal, mechanical, chemical and photo stabilities to withstand processing conditions associated with such devices.

BACKGROUND OF THE INVENTION

There has been a growing interest over the last decade in the nonlinear optical properties of conjugated organic and polymeric materials having delocalized π-electron distributions. Nonlinear optical properties are the basis of newly emerging photonics technologies in which light works with, or even replaces, electrons in applications traditionally carried out by microelectronics. Organic materials are advantageous in photonics because organic molecular design and synthesis is flexible, and crystalline and thin-film phases are relatively easy to prepare.

Nonlinear optical responses can, in general, be classified as resonant or non-resonant, depending upon how close the optical frequencies employed are to the natural absorption frequencies of the material. Non-resonant, second-order processes, in which the response is proportional to the square of applied electric fields, arise only in materials that are noncentrosymmetric and posses both a suitably delocalized π-electronic system and a large dipole moment. Second-order processes include second-harmonic generation, in which a material generates light at twice the frequency of the incident light, and the electrooptic effect, wherein an applied electric field changes the refractive index of the material and, therefore, alters the propagation properties of the incident light.

Compounds having nonlinear optical properties typically find use as single crystals or films layered upon a substrate, as main chains or side chains appended to a polymer core, or as "guests" dispersed in "host" polymers such as polyimides. The fabrication of semiconductors and other devices incorporating these structures can subject the nonlinear optical compound to temperatures on the order of –40° C. to about 320° C. These thermal requirements cannot be met by most known nonlinear optical compounds. The molecular units of crystals and films formed from such compounds typically are bound by relatively weak Van der Waals forces. Consequently, these crystals and films lack thermal and mechanical strength, and are highly susceptible to chemical attack and dissociation. For example, crystals of 2-methyl-4-nitroaniline, which are known to exhibit considerable nonlinearity, are so weakly bound that they actually sublime at room temperature.

Accordingly, there exists a need in the art for compounds that exhibit nonlinear optical properties yet can withstand semiconductor processing conditions. In particular, there is a need for compounds that are stable to high temperatures without detriment to their nonlinear optical coefficients.

OBJECTS OF THE INVENTION

It is one object of the present invention to provide novel materials that exhibit nonlinear optical properties.

It is another object of the invention to provide materials that exhibit second order nonlinear optical properties.

It is yet another object to provide nonlinear optical compounds that can be used as single crystals, crystalline films, polymer side chains, or as guests in polymer hosts or sol-gel glasses in semiconductor and other useful electronic or photonic devices.

It is a further object of the invention to provide nonlinear optical compounds that can withstand high temperatures, high light intensity, and other processing conditions associated with such devices.

It is still another object to provide nonlinear optical compounds that can be elaborated into oligomers and/or polymers which exhibit second order nonlinear optical and electrooptical properties.

SUMMARY OF THE INVENTION

These and other objects are satisfied by the present invention, which provides polycyclic aromatic compounds that exhibit both nonlinear optical properties and excellent chemical, thermal, and photo stability. In certain embodiments, the polycyclic aromatic compounds have formulas (1), (2), (3), or (4):

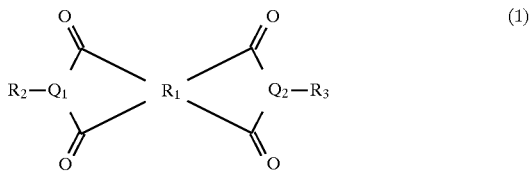

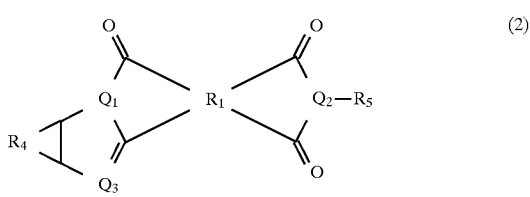

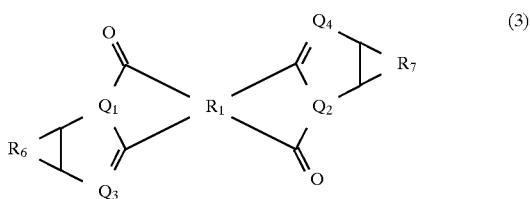

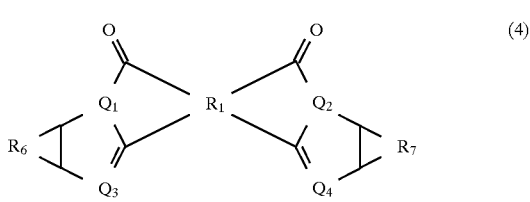

wherein:
$R_1$ is a tetravalent aromatic radical;
$Q_1$, $Q_2$, $Q_3$, and $Q_4$ are, independently, heteroatoms that participate in delocalized π-electron systems;

and $R_2-R_7$ are, independently, alkyl groups or aromatic groups.

In preferred embodiments, $R_2$ and $R_6$ are, independently, alkyl groups or aromatic groups that are electron-donating relative to hydrogen, and $R_3$ and $R_7$ are, independently, alkyl groups or aromatic groups that are electron-withdrawing relative to hydrogen. Preferably, one of $R_4$ and $R_5$ is an alkyl group or an aromatic group that is electron-donating relative to hydrogen, and the other is an alkyl group or an aromatic group that is electron-withdrawing relative to hydrogen.

In further preferred embodiments, the polycyclic aromatic compounds have formulas (5), (6), (7), or (8):

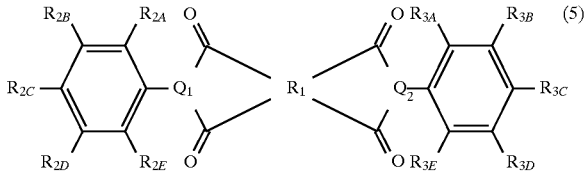

(5)

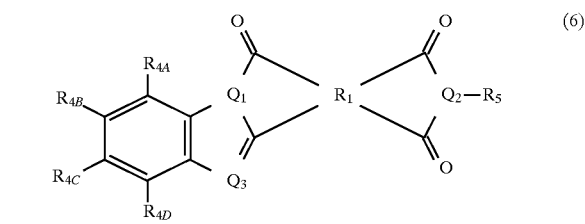

(6)

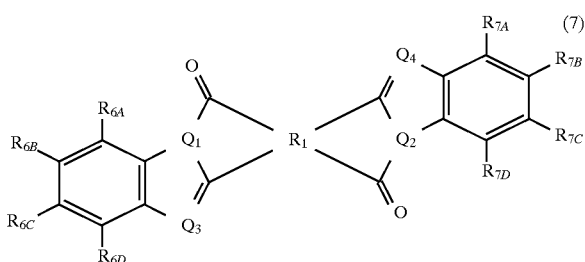

(7)

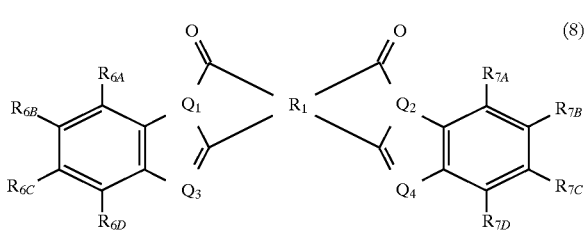

(8)

wherein:

$R_1$ is a tetravalent aromatic radical;

$Q_1$, $Q_2$, $Q_3$, and $Q_4$ are, independently, heteroatoms that participate in delocalized π-electron systems;

at least one of $R_{2A}-R_{2E}$ is an aromatic or non-aromatic group that is electron-donating relative to hydrogen;

at least one of $R_{3A}-R_{3E}$ is an aromatic or non-aromatic group that is electron-withdrawing relative to hydrogen;

at least one of $R_{4A}-R_{4D}$ is an aromatic or non-aromatic group that is electron-donating relative to hydrogen and $R_5$ is an alkyl or aromatic group that is electron-withdrawing relative to hydrogen, or at least one of $R_{4A}-R_{4D}$ is an aromatic or non-aromatic group that is electron-withdrawing relative to hydrogen and $R_5$ is an alkyl or aromatic group that is electron-donating relative to hydrogen;

at least one of $R_{6A}-R_{6D}$ is an aromatic or non-aromatic group that is electron-donating relative to hydrogen; and at least one of $R_{7A}-R_{7D}$ is an aromatic or non-aromatic group that is electron-withdrawing relative to hydrogen.

In preferred embodiments, $R_1$ is an aromatic hydrocarbon such as benzene, naphthalene or perylene and $Q_1-Q_5$ are N. Compounds of this type have been found to exhibit second order nonlinear optical properties and decomposition temperatures greater than about 360° C.

The present invention further provides nonlinear optical materials and devices that exhibit sensible nonlinear optical, piezoelectric or pyroelectric effects. In general, the devices comprise a layer that contains at least one polycyclic aromatic compound of the invention disposed upon a substrate. The layer can contain the compound in pure or substantially pure form (e.g., as crystals, oligomers, or polymers) or in combination with other chemical compounds such as known synthetic organic polymers or glasses made by a sol-gel method. See, e.g., L. C. Klein, "Sol-gel Technology for thin films, fibers, preforms, electronics, and specialty shapes", Noyes publications 1988. In certain embodiments, for example, the layer comprises synthetic organic polymer in admixture with a compound of the invention. In other embodiments, the synthetic polymer and compounds of the invention are covalently bound.

BRIEF DESCRIPTION OF THE DRAWINGS

The numerous objects and advantages of the present invention may be better understood by those skilled in the art by reference to the accompanying FIG. 1, which shows a device according to the invention comprising a substrate and a layer that contains a polycyclic aromatic compound of the invention.

DETAILED DESCRIPTION OF THE INVENTION

Figure 1:
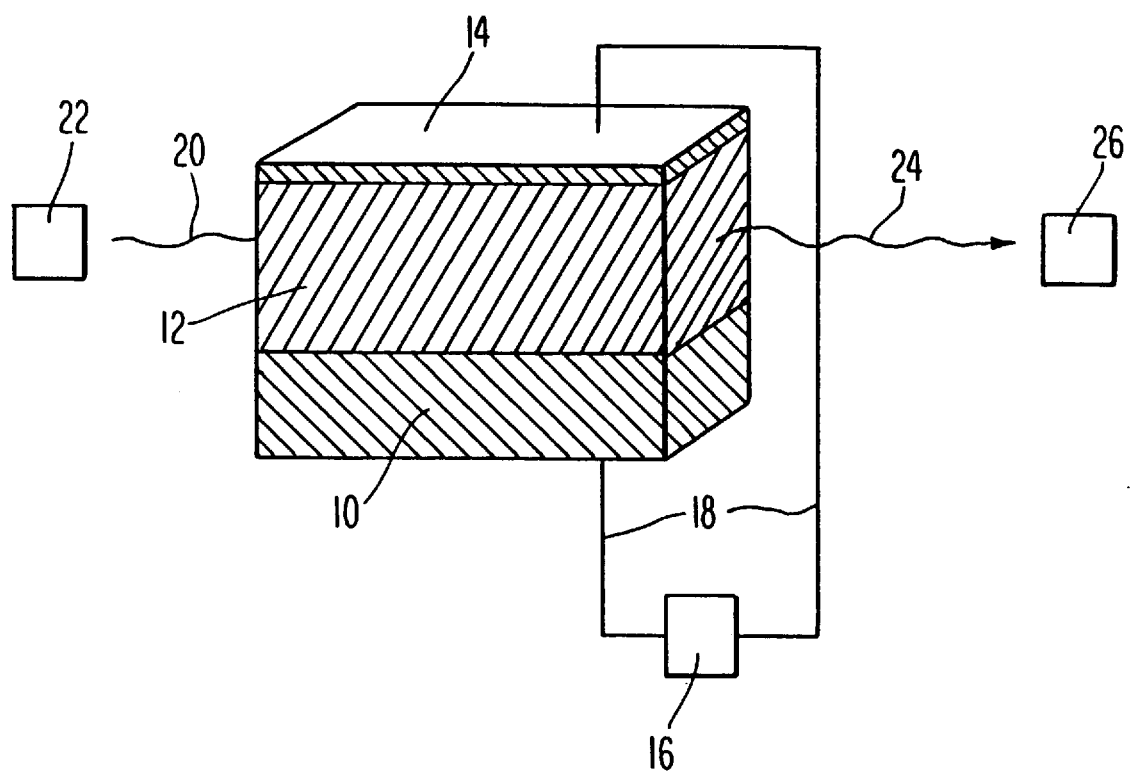

It has been found in accordance with the present invention that devices and materials containing certain thermally-stable, polycyclic aromatic compounds exhibit sensible nonlinear optical effects, particularly second order nonlinear optical and electrooptic effects. In general, useful polycyclic aromatic compounds possess both electron-donating and electron-withdrawing chemical functionality but no center of inversion symmetry on either the molecular or crystalline unit cell level. Indeed, it is believed that judicious placement of electron-donating and electron-withdrawing functionality within a compound of the invention actually contributes to an electronic asymmetry within the compound and, hence, to enhanced nonlinear optical effects.

In preferred embodiments, the polycyclic aromatic compounds that find use in practice of the present invention have formula (1), (2), (3), or (4). Typically, $R_1$ is a tetravalent aromatic radical. Preferably, $R_1$ is a derived from an aromatic hydrocarbon such as, for example, benzene, perylene, phenanthrene, anthracene, naphthalene, pyrene, chrysene, or naphthacene; aromatic groups derived from benzene, perylene, and naphthalene are particularly preferred. In accordance with the invention, $Q_1-Q_4$ are independently selected heteroatoms that can participate in a delocalized π-electron system spanning essentially the entire length of the compounds represented by formulas (1)–(4). Numerous suitable heteroatoms are known to those skilled in the art, including N, O, S, Se, and Te. Preferably, each of $Q_1-Q_4$ is N.

In embodiments represented by formulas (1)–(4), $R_2$, $R_6$, and one of $R_4$ and $R_5$ are alkyl groups or aromatic groups that possess net electron-donating effects, including straight chain and branched chain aliphatic hydrocarbons, straight chain and branched chain aliphatic hydrocarbons substituted with at least one substituent that is electron-donating relative to hydrogen, aromatic hydrocarbons, aromatic heterocycles, aromatic hydrocarbons substituted with at least one substituent that is electron-donating relative to hydrogen, or aromatic heterocycles substituted with at least one substituent that is electron-donating relative to hydrogen. Conversely, $R_3$, $R_7$, and one of $R_4$ and $R_5$ are alkyl groups or aromatic groups that possess net electron-withdrawing effects, including straight chain and branched chain aliphatic hydrocarbons substituted with at least one substituent that is electron-withdrawing relative to hydrogen, aromatic heterocycles, aromatic hydrocarbons substituted with at least one substituent that is electron-withdrawing relative to hydrogen, or aromatic heterocycles substituted with at least one substituent that is electron-withdrawing relative to hydrogen.

In embodiments represented by formulas (5)–(8), $R_{2A}$–$R_{2E}$, and $R_{6A}$–$R_{6D}$ can be substituents that possess net electron-donating effects. Conversely, $R_{3A}$–$R_{3E}$ and $R_{7A}$–$R_{7D}$ are substituents that possess net electron-withdrawing effects.

Numerous examples of electron-donating and electron-withdrawing aromatic functionality are well-known to those skilled in the art. Further, electron-donating and electron-withdrawing groups can be identified through routine experimentation (e.g., substitution for hydrogen in a molecule and testing of any resultant inductive effects). In preferred embodiments, electron-donating groups are aromatic hydrocarbons substituted with alkyl groups, alkylamino groups, $NH_2$, alkoxyl groups, OH, alkylthio groups, SH, and/or —OC(O)-(alkyl), wherein alkyl groups have from about 1–10 carbon atoms.

Electron-withdrawing groups preferably are aromatic hydrocarbons substituted with one or more groups selected from N-(alkyl)$_3^+$, S-(alkyl)$_2^+$, $NH_3^+$, $NO_2$, $SO_2$-(alkyl), CN, $SO_2$-(aromatic), C(O)OH, F, Cl, Br, I, C(O)O-(alkyl), C(O)-(alkyl), and/or CHO, wherein alkyl groups have from about 1–10 carbon atoms and aromatic groups have about 6–24 carbon atoms.

It has been found in accordance with the invention that polycyclic aromatic compounds exhibiting sensible, second order nonlinear optical effects can be identified (screened) on the basis of their UV/visible spectra. In general, useful compounds exhibit at least one UV/visible transition, or, equivalently, excitation, having an extinction coefficient greater than about $1 \times 10^5$ l mole$^{-1}$ cm$^{-1}$ as determined by standard techniques. Such an electronic excitation should principally be responsible for a second order nonlinear optical effect, especially under non-resonant conditions.

Preferred polycyclic aromatic compounds according to the present invention have formulas (9)–(20).

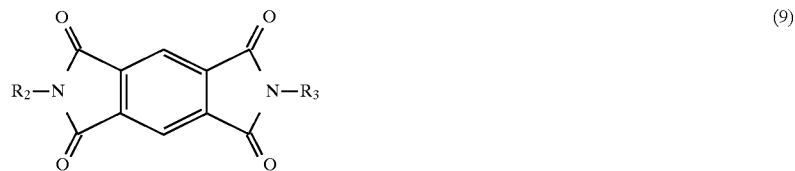

(9)

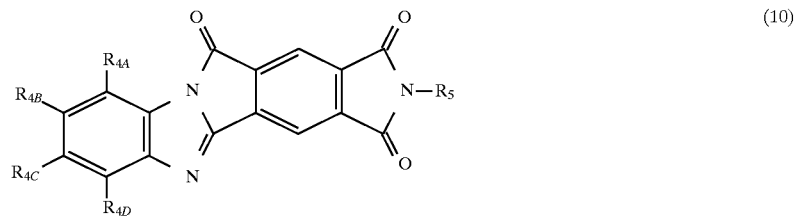

(10)

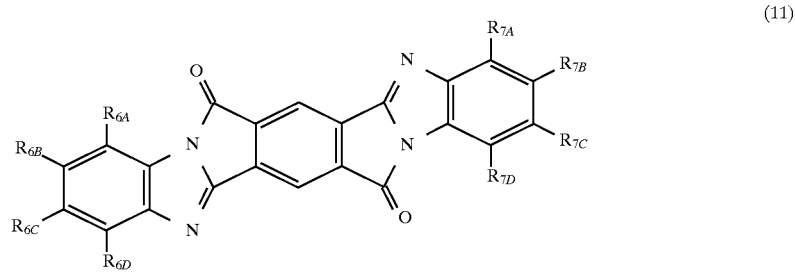

(11)

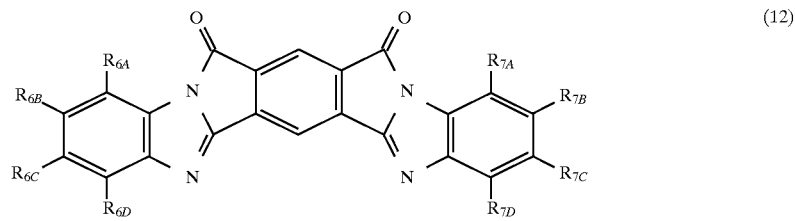

(12)

-continued
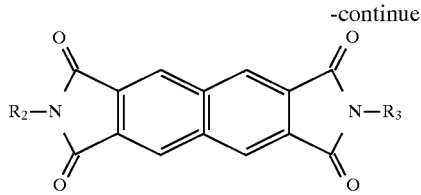 (13)
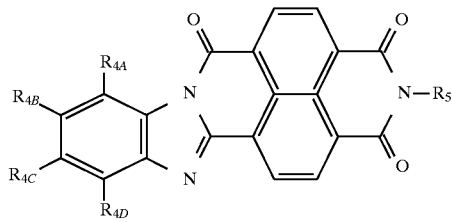 (14)
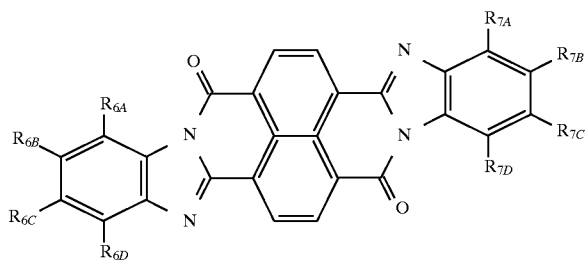 (15)
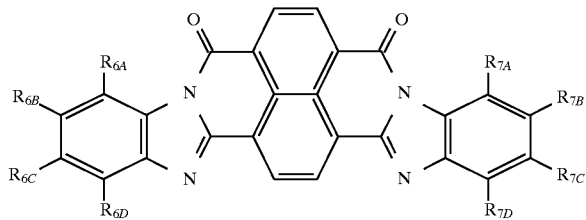 (16)
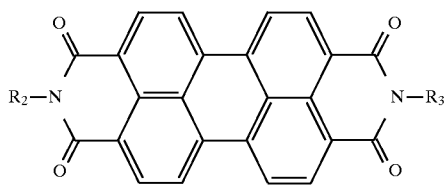 (17)
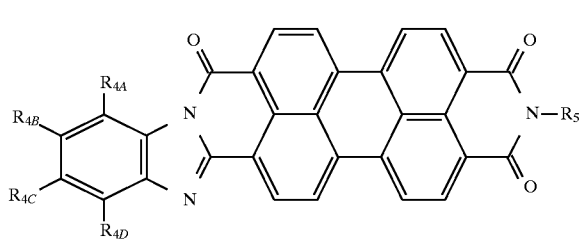 (18)
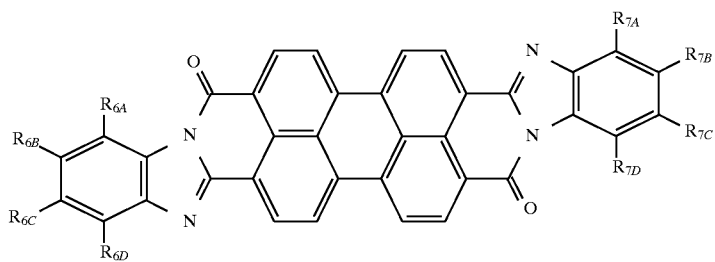 (19)

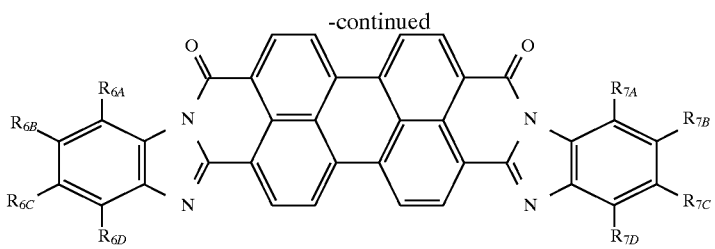
(20)

The polycyclic aromatic compounds of the invention find use in a wide variety of devices, including electro-optical, second harmonic generating, electro-acoustic, waveguide, semiconductor, and other photonic or electronic devices.

As shown in FIG. 1, devices according to the invention generally comprise a dielectric or some other substrate 10 and a layer 12, disposed on the substrate, comprising at least one polycyclic aromatic compound of the invention. Useful substrates include semiconductors such as silicon gallium and arsenide or insulators such as glass or plastic. Layer 12 can contain a polycyclic aromatic compound of the invention in pure or substantially pure form as, for example, crystals, crystalline films, oligomers or polymers. Those skilled in the art will appreciate that a wide variety of polymeric and oligomeric structures can be constructed in accordance with the present invention using compounds having formulas (1), (2), (3), and/or (4) as monomeric building blocks. For example, formulas (21) and (22) show representative structures wherein $R_8$ is alkyl or aromatic, $R_9$ is O or NH, $Q_5$ is a heteroatom that can participate in a delocalized π-electron system, and n is from 2 to about 2000.

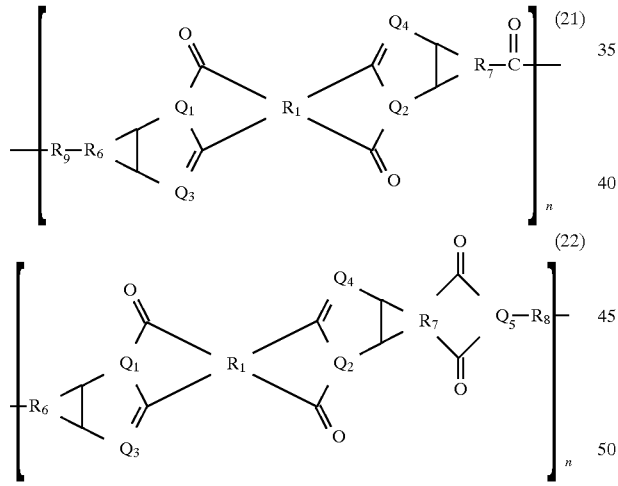

Alternatively, layer 12 can contain a polycyclic aromatic compound of the invention in combination with one or more synthetic organic polymers. In certain embodiments, for example, the layer can include synthetic organic polymer or precursors thereof (e.g., monomers, catalysts, and sensitizers) in admixture with a compound having formula (1), (2), (3), and/or (4). As discussed below in greater detail, such embodiments offer the possibility of effecting cross-linking and/or in situ polymerization following mixture of the polymer or polymer precursor system with a compound of the invention. Where the polymer constitutes a major proportion of the layer and the polycyclic compound constitutes a minor proportion of the layer, the compound can be said to be a "guest" in the "host" polymer.

In other embodiments, layer 12 includes one or more compounds of the invention covalently bound as side chains on a polymeric backbone or core. Exemplary backbone/side chain structures are provided by formulas (23) and (24), wherein: $R_8$ is alkyl or aromatic; $R_9$ is O or NH; $R_{10}$ is a tetravalent aromatic radical; $R_{11}$ and $R_{12}$ are, independently, alkyl or aromatic; $Q_5$ is a heteroatom that can participate in a delocalized π-electron system; and n is from 2 to about 2000. Those skilled in the art will recognize that a wide variety of other structures are possible.

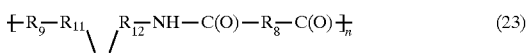

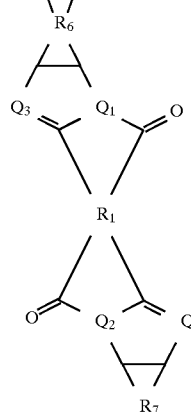

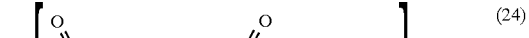

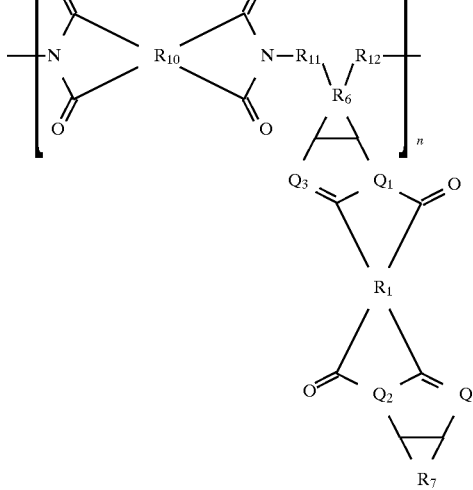

It is believed that the polycyclic aromatic compounds of the invention can be mixed with virtually any synthetic organic polymer or polymer precursor system known in the art. It is also believed that the compounds of the invention can be covalently bound with an equally wide variety of polymers, possibly through use of linking moieties such as alkyl, alkoxyl, and or alkylamino groups. Representative synthetic organic polymers include polyimides, polyacrylates, polymethacrylates, polyesters, polycarbonates, polystyrenes, polyolefins, and polyvinyl ethers. Polyimides, particularly those disclosed in Harris, et al., *Polym. Prepr.,* 1990, 31, 342 are preferred polymers.

The coating of a substrate with a material comprising a polycyclic aromatic compound of the invention can be accomplished by any means known in the art, preferably by spin-coating, role-coating, or physical vapor deposition. L. I. Maissel and R. Glang, *Handbook of Thin Film Technology,* McGraw-Hill (1970); Satas, *Coating Technology Handbook,* Marcel Dekker (1991). The materials used to form layer 12 can further include other moieties such as, for example, pigments, dyes, filters and dopants.

Polymerization and/or crosslinking of a layer following its deposition on a substrate can be accomplished in any of the ways known to those skilled in the art. For example, certain polymerizations can be effected by simple heating in the presence of a suitable initiator or by the incidence of light or some other form of electromagnetic energy in the presence or absence of a sensitizer. The latter procedure is preferred due to the ability of those in the art to effect selective, patterned polymerization through the use of, for example, removable masking agents. As will be recognized, devices incorporating appropriately arrayed patterns of polymer can be employed in microcircuitry and other applications.

In embodiments such as shown in FIG. 1, certain devices of the invention comprise a conductor superstrate 14 disposed on layer 12, control means 16, and contacts 18 attached to substrate 10 and superstrate 14. This arrangement allows an input light signal 20 from source 22 to be operated upon by virtue of a changing electric field within layer 12 generated by control means 16 in concert with contacts 18. Altered or "operated" light signal 24 is directed away from the layer to a suitable detector 26. A wide variety of devices fitting this general description are well-known to those skilled in the art. Representative examples are disclosed by Garito, et al., *Mat. Res. Soc. Symp. Proc.,* 1990, 173.

Those skilled in the art will recognize that devices according to the present invention offer the advantage of flexibility in their design and use. For example, the waveguiding properties of the compounds of the invention can be combined with the nonlinear optical properties so that a guided light wave can be operated upon electro-optically. Indeed, large arrays of nonlinear optical, semiconductor and other photonic or electronic devices can be formed within a waveguiding system so as to result in assemblies of devices of diverse character and use.

Additional objects, advantages, and novel features of this invention will become apparent to those skilled in the art upon examination of the following examples thereof, which are not intended to be limiting.

EXAMPLE 1

3,4-Peryloylene-benzimidazole-9,10-dicarbox-N-(2, 5-di-tert-butyl)phenyl imide

N-(2,5-Di-tert-butylphenyl)-3,4,9,10-perylene tetracarboxylic acid-3,4-anhydride-9,10-imide (0.6 mmol) and 1,2-phenylene diamine (27 mmol) were heated to 180° C. without solvent for 4 hours. After cooling, the resulting solution was poured into 70% ethanol, filtered, and washed with 90% methanol. The residue was boiled with 1% potassium hydroxide solution, filtered, washed with methanol, and dried. Yield 88%.

The molecular second-order optical susceptibility ($\beta$) was measured in 1,4-dioxane solution by DC-induced second harmonic generation (DCSHG) using fundamental wavelength of 1.907 $\mu$m, obtained by stimulated Raman scattering from Q-switched Nd:YAG laser. The product of $\beta$ and ground state-dipole moment ($\mu$) was evaluated. 1 $\beta\mu$l<100× $10^{-48}$ esu; UV-Vis Absorption (CHCl$_3$)=571, 527, 492 nm; Solubility (Dioxane)=0.5×10$_{-3}$M; TG-DTA (−3%)=410° C.

EXAMPLE 2

3,4-Peryloylene-benzimidazole-9,10-dicarbox-N-(m-pentyl)phenyl imide

N-(n-pentyl)-3,4,9,10-perylene tetracarboxylic acid-3,4-anhydride-9,10-imide (2.6 mmol) and 1,2-phenylene diamine (33.8 mmol) were heated to 190° C. in 5 ml of quinoline for 4 hours. After cooling, the resulting solution was poured into 95% methanol, filtered, and washed with methanol. The residue was boiled with 1% potassium hydroxide solution, filtered, washed with methanol, and dried. Yield=80%. 1 $\beta\mu$l<100×$10^{-48}$ esu; UV-Vis Absorption (CHCl$_3$)=570, 530 nm; Solubility (Dioxane)<0.1×$10^{-3}$M; TG-DTA (−3%)=420° C.

EXAMPLE 3

3,4-Peryloylene-(3'-nitro)benzimidazole-9,10-dicarbox-N-(2,5-di-tert-butyl)phenyl imide N-(2,5-Di-tert-butylphenyl)-3,4,9,10-perylene tetracarboxylic acid-3,4-anhydride-9,10-imide (0.6 mmol) and 4-nitro-1,2-phenylene diamine (15.3 mmol) were heated to 220° C. without solvent for 2.5 hours. After cooling, the resulting solution was poured into 95% methanol and filtered. The residue was boiled with 1% potassium hydroxide solution, filtered, washed with methanol, and dried. Yield= 45%. 1 $\beta\mu$l<100×$10^{-48}$ esu; UV-Vis Absorption (CHCl$_3$)= 566, 528 nm; Solubility (Dioxane)=TG-DTA (−3%)=370° C.

EXAMPLE 4

3,4-Peryloylene-(3',4'-dimethyl)benzimidazole-9,10-dicarbox-N-(2,5-di-tert-butyl)phenyl imide N-(2,5-di-tert-butylphenyl)-3,4,9,10-perylene tetracarboxylic diimide (1.21 mmol) and 4,5-dimethyl-1,2-phenylene diamine (14.7 mmol) were heated to 235° C. in 2 ml quinoline and 280 ml of zinc acetate for 4 hours. After cooling, the resulting solution was poured into 80% methanol and filtered. The residue was boiled with 10% potassium carbonate solution, filtered, washed with methanol, and dried. Yield=70%. UV-Vis Absorption (CHCl$_3$)=581, 551, 523, 488 nm; TG-DTA (3%)=420° C.

EXAMPLE 5

1,8-Napthoylene-benzimidazole-4,5-dicarbox-N-(2, 5-di-tert-butyl)phenylimide 1,8-Naphthoylene-benzimidazole-4,5-carboxylic anhydride (4.4 mmol) and 2,5-di-tert-butylaniline (13.2 mmol) were heated to 230° C. in 7.5 ml of quinoline and 530 mg of zinc acetate for 2.5 hours. After cooling, the resulting solution was poured into 80% methanol, filtered, and further purified by column chromatography on silica gel with methylene chloride-ethyl acetate. Yield=83%. UV-Vis Absorption (CHCl$_3$)=440, 368, 313 nm; TG-DTA (melt)=335° C.

EXAMPLE 6

1,8-Naphthoylene-(4'-methoxy)benzimidazole-4,5-dicarbox-N-(2,5-di-tert-butyl)phenyl imide 1,8-Naphthoylene-(4'-methoxy)benzimidazole-4,5-dicarboxylic anhydride (1.62 mmol) and 2,5-di-tert-butyl aniline (4.86 mmol) were heated to 225° C. in 3 ml of quinoline and 210 mg of zinc acetate for 4 hours. After cooling, the resulting solution was poured into 70% methanol, filtered, washed with 90% methanol, and further purified by column chromatography on silica gel with methylene chloride. Yield=76%. βμ=40×10⁻⁴⁸ esu. UV-Vis Absorption (CHCl₃)=485, 435, 370, 321 nm; TG-DTA (melt)=299° C.

EXAMPLE 7

1,8-Naphthoylene-(3'-nitro)benzimidazole-4,5-dicarbox-N-(2,5-di-tert-butyl)phenyl imide 1.8-Napthoylene-(3'-nitro)benzimidazole-4,5-dicarboxylic anhydride (2.60 mmol) and 2,5-di-tert-butylaniline (7.79 mmol) were heated to 200° C. in 5 ml of quinoline and 350 mg of zinc acetate for 2.5 hours. After cooling, the resulting solution was poured into 70% methanol, filtered, washed with 80% methanol, and further purified by column chromatography on silica gel with methylene chloride. Yield=60%. Uv-Vis Absorption (CHCl₃)= 425 nm, 360 nm.

EXAMPLE 8

1,8-Naphthoylene-(3'-amino)benzimidazole-4,5-dicarbox-N-(2,5-di-tert-butyl)phenyl imide.

Sodium hydrosulfite (0.274 g) was added as a 20% aqueous solution into 0.524 mmol of 1,8-Naphthoylene-(3'-nitrobenzimidazole-4,5-dicarbox-N-(2,5-di-tert-butyl) phenyl imide in 10 ml of N,N-dimethyl acetamide at 80° C. It was purified by column chromatography on silica gel with chloroform. Yield=25% βμ=410×10⁻⁴⁸ esu; UV-Vis Absorption (CHCl₃)=550.343 nm; TG-DTA (melt)=360° C.

EXAMPLE 9

1,8-Naphthoylene-naphthopyrimidine-4,5-dicarbox-N-(2,5-di-tertbutyl)phenyl imide.

1,8-Naphthoylene-naphthopyrimidine-4,5-dicarboxylic anhydride (5.12 mmol) and 2,5-di-tert-butylaniline (15.4 mmol) were heated to 225° C. in 10 ml of quinoline and 700 mg of zinc acetate for 3 hours. After cooling, the resulting solution was poured into 70% methanol, filtered, and further purified by column chromatography on silica gel with methylene chloride. Yield=53%. UV-Vis Absorption (CHCl₃)= 592, 560, 378 nm; TG-DTA (melt)=363° C.

EXAMPLE 10

Thin film of 3,4-Peryloylene-(3'-nitro) benzimidazole-9,10-dicarbox-N-(2,5-di-tert-butyl) phenyl imide.

Using a syringe equipped with a 0.2 μm filter, a nearly saturated solution of the perylene derivative in N-methylpyrrolidinone (NMP) was dispensed into LQ2200 polyimide resin (Hitachi Chemical) and made a 4% solution (dye/polymer weight ratio). The resulting solution was agitated slightly and then spin coated onto a glass-slide substrate, which was baked at 110° C. in a vacuum oven for one hour, cured at 200° C. for half an hour, and finally cured at 250° C. and above. The perylene-based guest molecules were aligned by application of a DC field on a coplanar electrode in the host polyimide. The resulting clear, red-purple film was about 2–4 μm thick. The thickness of the film can be controlled by adjusting the spin speed.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A process for preparing a composition that exhibits at least one sensible, second order nonlinear optical effect, comprising the steps of mixing synthetic organic polymer with at least one compound having formula (2), (3), or (4):

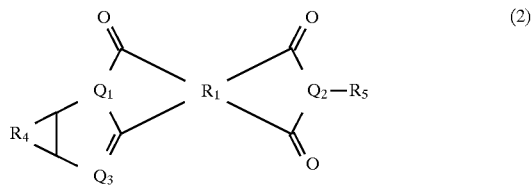

(2)

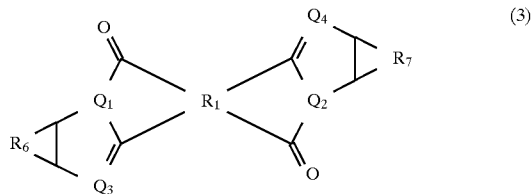

(3)

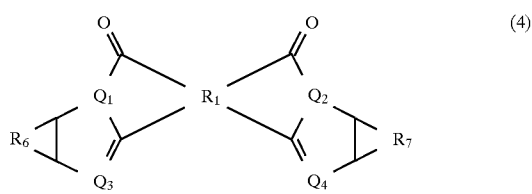

(4)

wherein:

$R_1$ is a tetravalent aromatic radical;

$Q_1$, $Q_2$, $Q_3$, and $Q_4$ are, independently, heteroatoms that participate in delocalized π-electron systems;

$R_6$ is an alkyl group or an aromatic group that is electron-donating relative to hydrogen;

$R_3$ and $R_7$ are, independently, alkyl groups or aromatic groups that are electron-withdrawing relative to hydrogen; and one of $R_4$ and $R_5$ is an alkyl group or an aromatic group that is electron-donating relative to hydrogen, and the other of $R_4$ and $R_5$ is an alkyl group or an aromatic group that is electron-withdrawing relative to hydrogen.

2. The process of claim 1 wherein $R_1$ is an aromatic hydrocarbon.

3. The process of claim 1 wherein $R_1$ is derived from benzene, naphthalene, or perylene.

4. The process of claim 1 wherein $Q_1$, $Q_2$, $Q_3$, and $Q_4$ are, independently, N, O, S, Se, or Te.

5. The process of claim 1 wherein $Q_1$, $Q_2$, $Q_3$, and $Q_4$ are N.

6. The process of claim 1 wherein $R_3$ is an aromatic heterocycle, an aromatic hydrocarbon substituted with at least one substituent that is electron-withdrawing relative to hydrogen, or aromatic heterocycle substituted with at least one substituent that is electron-withdrawing relative to hydrogen.

7. The process of claim 6 wherein said electron-withdrawing substituent is N-(alkyl)$_3^+$, S-(alkyl)$_2^+$, NH$_3^+$, NO$_2$, SO$_2$-(alkyl), CN, SO$_2$-(aromatic), C(O)OH, F, Cl, Br, I, C(O)O-(alkyl), C(O)-(alkyl) or CHO.

8. The process of claim 6 wherein $R_3$ is $NO_2$, CN, C(O)OH, or C(O)O-(alkyl).

9. The process of claim 1 wherein at least one of $R_{4A}$–$R_{4D}$ or $R_5$ is an alkyl group, an alkylamino group, $NH_2$, an alkoxyl group, OH, an alkylthio group, SH, or —OC(O)-(alkyl).

10. The process of claim 1 wherein at least one of $R_{4A}$–$R_{4D}$ or $R_5$ is an alkylamino group, $NH_2$, an alkoxyl group, or an alkylthio group.

11. The process of claim 1 wherein at least one of $R_{4A}$–$R_{4D}$ or $R_5$ is N-(alkyl)$_3^+$, S-(alkyl)$_2^+$, $NH_3^+$, $NO_2$, $SO_2$-(alkyl), CN, $SO_2$-(aromatic), C(O)OH, F, Cl, Br, I, C(O)O-(alkyl), C(O)-(alkyl) or CHO.

12. The process of claim 1 wherein at least one of $R_{4A}$–$R_{4D}$ or $R_5$ is $NO_2$, CN, C(O)OH, or C(O)O-(alkyl).

13. The process of claim 1 wherein at least one of $R_{6A}$–$R_{6D}$ is an alkyl group, an alkylamino group, $NH_2$, an alkoxyl group, OH, an alkylthio group, SH, or —OC(O)-(alkyl).

14. The process of claim 1 wherein at least one of $R_{7A}$–$R_{7D}$ is N-(alkyl)$_3^+$, S-(alkyl)$_2^+$, $NH_3^+$, $NO_2$, $SO_2$-(alkyl), CN, $SO_2$-(aromatic), C(O)OH, F, Cl, Br, I, C(O)O-(alkyl), O-(alkyl), C(O)-(alkyl) or CHO.

15. The process of claim 1 wherein at least one of $R_{7A}$–$R_{7D}$ is $NO_2$, CN, C(O)OH, or C(O)O-(alkyl).

16. The process of claim 1 wherein said compound produces a UV/visible spectra exhibiting at least one transition that has an extinction coefficient greater than about $1 \times 10^5$ l mole$^{-1}$ cm$^{-1}$.

17. The process of claim 1 wherein said compound has formula (2).

18. The process of claim 1 wherein said compound has formula (3).

19. The process of claim 1 wherein said compound has formula (4).

20. The process of claim 1 wherein said compound has formula (6), (7), or (8):

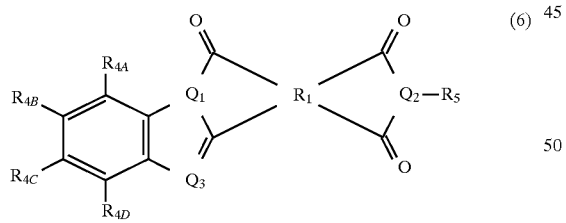

(6)

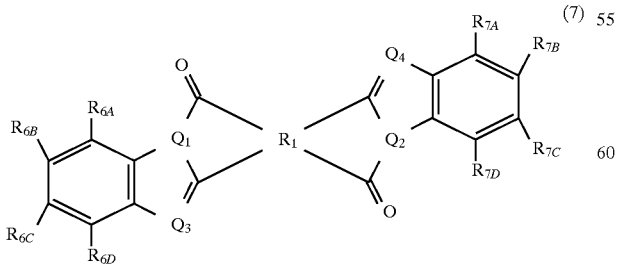

(7)

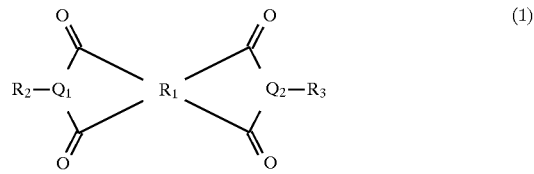

-continued wherein:
at least one of $R_{4A}$–$R_{4D}$ is an aromatic or non-aromatic group that is electron-donating relative to hydrogen; or an aromatic or non-aromatic group that is electron-withdrawing relative to hydrogen;

at least one of $R_{6A}$–$R_{6D}$ is an aromatic or non-aromatic group that is electron-donating relative to hydrogen; and at least one of $R_{7A}$–$R_{7D}$ is an aromatic or non-aromatic group that is electron-withdrawing relative to hydrogen.

21. The process of claim 1 wherein said compound has formula (10), (11) or (12).

22. The process of claim 1 wherein said compound has formula (14), (15), or (16).

23. The process of claim 1 wherein said compound has formula (18), (19), or (20).

24. The process of claim 1 wherein said polymer is covalently bound with said compound.

25. The process of claim 1 wherein said polymer constitutes a major proportion of said composition and said compound constitutes a minor proportion of said composition.

26. The process of claim 1 wherein said polymer is a polyimide, a polyacrylate, a polymethacrylate, a polyester, a polycarbonate, a polystyrene, a polyolefin, a polyvinyl ether, or a mixture thereof.

27. A process for preparing a composition that exhibits at least one sensible, second order nonlinear optical effect, comprising the steps of mixing synthetic organic polymer with at least one compound having formula (1):

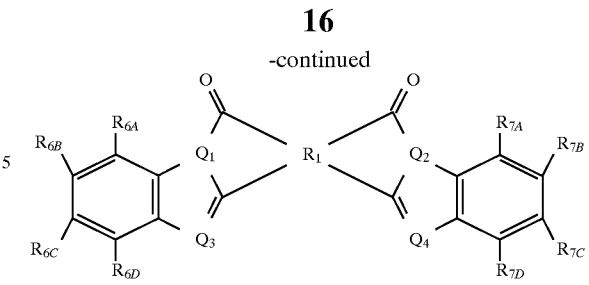

(1)

wherein:
$R_1$ is a tetravalent aromatic radical;

$Q_1$ and $Q_2$ are, independently, heteroatoms that participate in delocalized π-electron systems;

$R_2$ is an alkyl group that is electron-donating relative to hydrogen; and $R_3$ is an alkyl group or an aromatic groups that is electron-withdrawing relative to hydrogen.

28. The process of claim 27 wherein $R_2$ is an alkylamino group, $NH_2$, an alkoxyl group, or an alkylthio group.

29. A process for preparing a composition that exhibits at least one sensible, second order nonlinear optical effect, comprising the steps of mixing synthetic organic polymer with at least one compound having formula (9), (13), or (17):

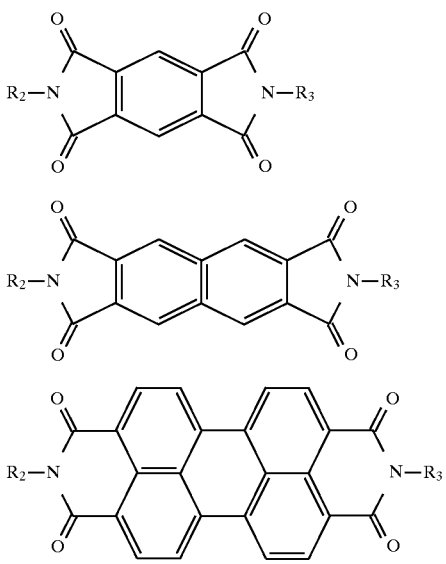

wherein:

R$_2$ is an alkyl groups or an aromatic group that is electron-donating relative to hydrogen; and R$_3$ is an alkyl group or an aromatic group that is electron-withdrawing relative to hydrogen.

30. A composition that exhibits at least one sensible, second order nonlinear optical effect, comprising synthetic organic polymer and at least one compound having formula (2), (3), or (4):

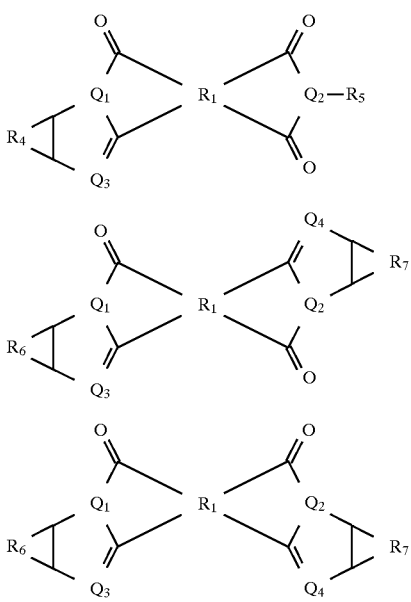

wherein:

R$_1$ is a tetravalent aromatic radical;

Q$_1$, Q$_2$, Q$_3$, and Q$_4$ are, independently, heteroatoms that participate in delocalized π-electron systems;

R$_6$ is an alkyl group or an aromatic group that is electron-donating relative to hydrogen;

R$_3$ and R$_7$ are, independently, alkyl groups or aromatic groups that are electron-withdrawing relative to hydrogen; and one of R$_4$ and R$_5$ is an alkyl group or an aromatic group that is electron-donating relative to hydrogen, and the other of R$_4$ and R$_5$ is an alkyl group or an aromatic group that is electron-withdrawing relative to hydrogen.

31. The composition of claim 30 wherein R$_1$ is an aromatic hydrocarbon.

32. The composition of claim 30 wherein R$_1$ is derived from benzene, perylene, phenanthrene, anthracene, naphthalene, pyrene, chrysene, or naphthacene.

33. The composition of claim 30 wherein R$_1$ is derived from benzene, naphthalene, or perylene.

34. The composition of claim 30 wherein Q$_1$, Q$_2$, Q$_3$, and Q$_4$ are, independently, N, O, S, Se, or Te.

35. The composition of claim 30 wherein Q$_1$, Q$_2$, Q$_3$, and Q$_4$ are N.

36. The composition of claim 30 wherein R$_3$ is an aromatic heterocycle, an aromatic hydrocarbon substituted with at least one substituent that is electron-withdrawing relative to hydrogen, or aromatic heterocycle substituted with at least one substituent that is electron-withdrawing relative to hydrogen.

37. The composition of claim 36 wherein said electron-withdrawing substituent is N-(alkyl)$_3^+$, S-(alkyl)$_2^+$, NH$_3^+$, NO$_2$, SO$_2$-(alkyl), CN, SO$_2$-(aromatic), C(O)OH, P, Cl, Br, I, C(O)O-(alkyl), C(O)-(alkyl) or CHO.

38. The composition of claim 36 wherein R$_3$ is NO$_2$, CN, C(O)OH, or C(O)O-(alkyl).

39. The composition of claim 30 wherein at least one of R$_{4A}$–R$_{4D}$ or R$_5$ is an alkyl group, an alkylamino group, NH$_2$, an alkoxyl group, OH, an alkylthio group, SH, or —OC(O)-(alkyl).

40. The composition of claim 30 wherein at least one of R$_{4A}$–R$_{4D}$ or R$_5$ is an alkylamino group, NH$_2$, an alkoxyl group, or an alkylthio group.

41. The composition of claim 30 wherein at least one of R$_{4A}$–R$_{4D}$ or R$_5$ is N-(alkyl)$_3^+$, S-(alkyl)$_2^+$, NH$_3^+$, NO$_2$, SO$_2$-(alkyl), CN, SO$_2$-(aromatic), C(O)OH, P, Cl, Br, I, C(O)O-(alkyl), C(O)-(alkyl), or CHO.

42. The composition of claim 30 wherein at least one of R$_{4A}$–R$_{4D}$ or R$_5$ is NO$_2$, CN, C(O)OH, or C(O)O-(alkyl).

43. The composition of claim 30 wherein at least one of R$_{6A}$–R$_{6D}$ is an alkyl group, an alkylamino group, NH$_2$, an alkoxyl group, OH, an alkylthio group, SH, or —OC(O)-(alkyl).

44. The composition of claim 30 wherein at least one of R$_{7A}$–R$_{7D}$ is N-(alkyl)$_3^+$, S-(alkyl)$_2^+$, NH$_3^+$, NO$_2$, SO$_2$-(alkyl), CN, SO$_2$-(aromatic), C(O)OH, F, Cl, Br, I, C(O)O-(alkyl), O-(alkyl), C(O)-(alkyl) or CHO.

45. The composition of claim 30 wherein at least one of R$_{7A}$–R$_{7D}$ is NO$_2$, CN, C(O)OH, or C(O)O-(alkyl).

46. The composition of claim 30 wherein said compound produces a UV/visible spectra exhibiting at least one transition that has an extinction coefficient greater than about $1 \times 10^5$ l mole$^{-1}$, cm$^{-1}$.

47. The composition of claim 30 wherein said compound has formula (2).

48. The composition of claim 30 wherein said compound has formula (3).

49. The composition of claim 30 wherein said compound has formula (4).

50. The composition of claim 30 wherein said compound has formula (6), (7), or (8):

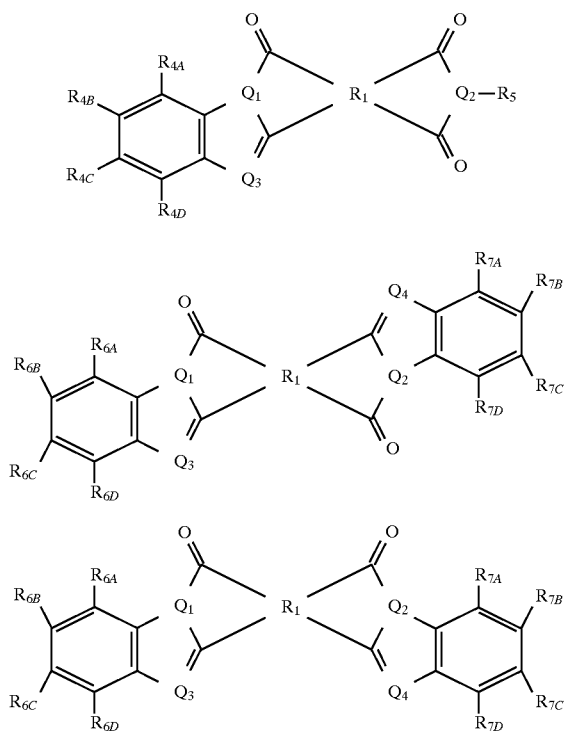

wherein
- at least one of $R_{4A}$–$R_{4D}$ is an aromatic or non-aromatic group that is electron-donating relative to hydrogen; or an aromatic or non-aromatic group that is electron-withdrawing relative to hydrogen;
- at least one of $R_{6A}$–$R_{6D}$ is an aromatic or non-aromatic group that is electron-donating relative to hydrogen; and
- at least one of $R_{7A}$–$R_{7D}$ is an aromatic or non-aromatic group that is electron-withdrawing relative to hydrogen.

51. The composition of claim 30 wherein said compound has formula (10), (11) or (12):

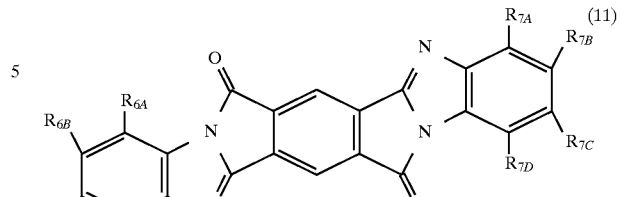

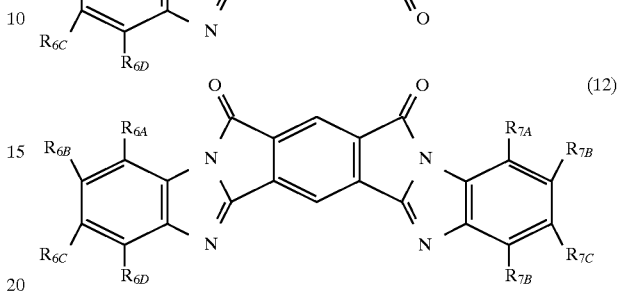

52. The composition of claim 30 wherein said compound has formula (14), (15), or (16):

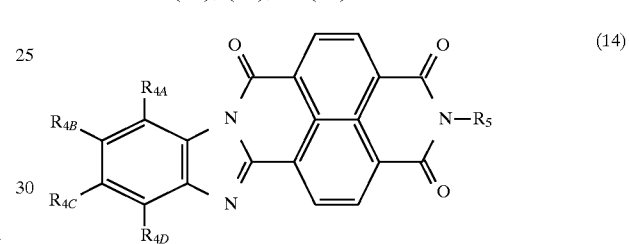

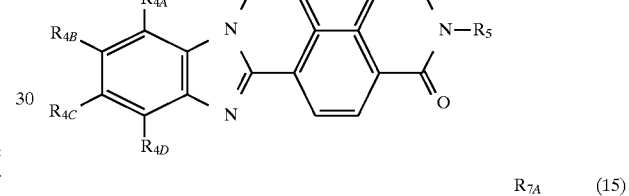

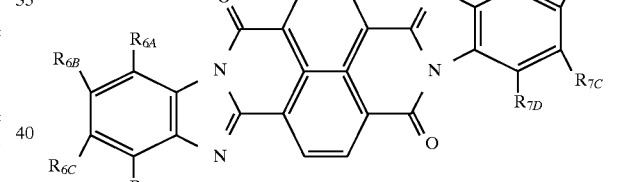

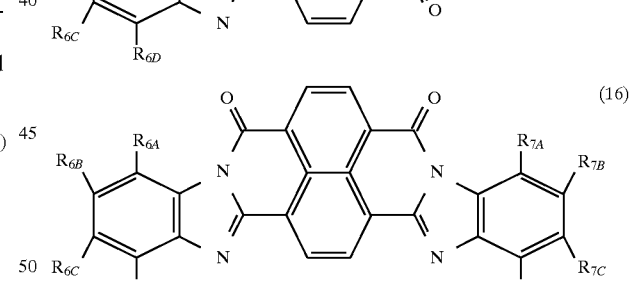

53. The composition of claim 30 wherein said compound has formula (18), (19), or (20):

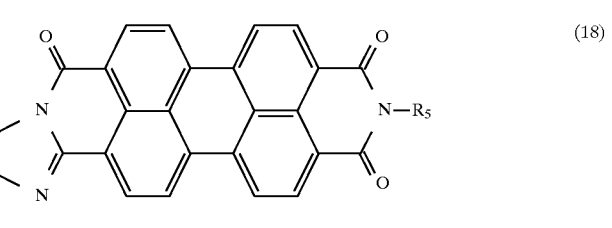

-continued

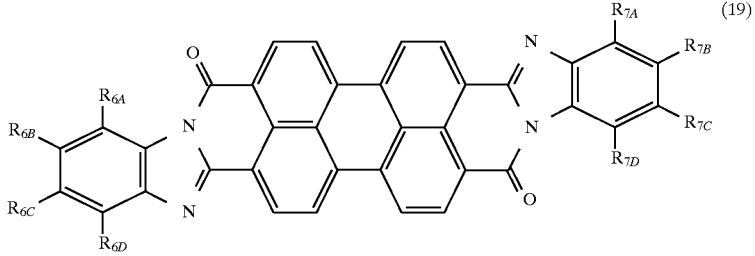

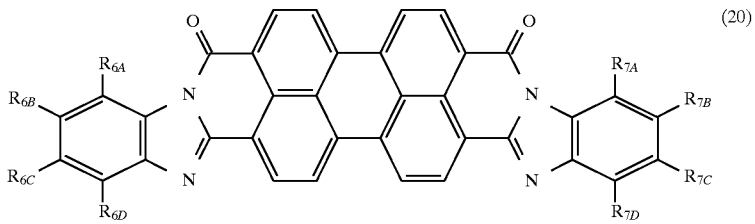

54. The composition of claim 30 wherein said polymer is covalently bound with said compound.

55. The composition of claim 30 wherein said polymer constitutes a major proportion of said composition and said compound constitutes a minor proportion of said composition.

56. The composition of claim 30 wherein said polymer is a polyimide, a polyacrylate, a polymethacrylate, a polyester, a polycarbonate, a polystyrene, a polyolefin, a polyvinyl ether, or a mixture thereof.

57. A composition that exhibits at least one sensible, second order nonlinear optical effect, comprising synthetic organic polymer and at least one compound hating formula (1):

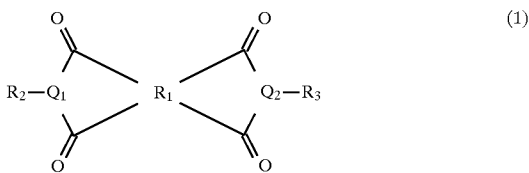

wherein:
- $R_1$ is a tetravalent aromatic radical;
- $Q_1$ and $Q_2$ are, independently, heteroatom that participate in delocalized π-electron systems;
- $R_2$ is an alkyl group that is electron-donating relative to hydrogen; and
- $R_3$ is an alkyl group or an aromatic groups that is electron-withdrawing relative to hydrogen.

58. The composition of claim 56 wherein $R_2$ is an alkylamino group, $NH_2$, an alkoxyl group, or an alkylthio group.

59. A composition that exhibits at least one sensible, second order nonlinear optical effect, comprising synthetic organic polymer and at least one compound having formula (9), (13), or (17):

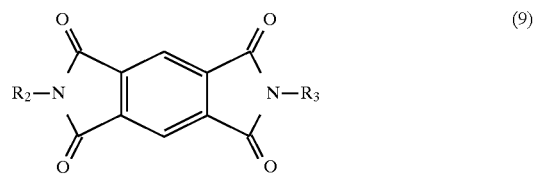

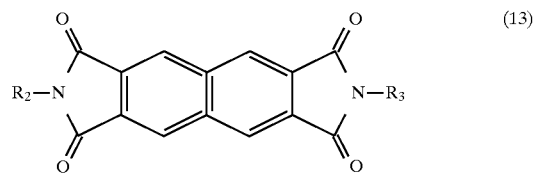

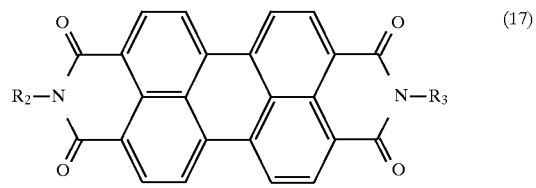

wherein:
- $R_2$ is an alkyl groups or an aromatic group that is electron-donating relative to hydrogen; and
- $R_2$ is an alkyl group or an aromatic group that is electron-withdrawing relative to hydrogen.

* * * * *